United States Patent [19]

Bullock

[11] Patent Number: 4,638,278
[45] Date of Patent: Jan. 20, 1987

[54] MAGNETIC DETECTOR APPARATUS
[75] Inventor: Mark E. Bullock, Duncan, Okla.
[73] Assignee: Halliburton Company, Duncan, Okla.
[21] Appl. No.: 819,167
[22] Filed: Jan. 14, 1986
[51] Int. Cl.[4] .............................................. H01H 9/00
[52] U.S. Cl. .................................... 335/207; 335/205; 335/206; 361/169.1; 324/220; 324/260; 200/82 E
[58] Field of Search ...................... 335/205, 206, 207; 361/169, 180; 324/219, 220, 260; 200/82 E

[56] References Cited
U.S. PATENT DOCUMENTS 4,071,725  1/1978  Smith et al. ........................ 200/82 E
4,161,685  7/1979  Jacob .............................. 361/180 X
4,213,110  7/1980  Holce .................................. 335/207

OTHER PUBLICATIONS
IBM Tecnical Disclosure Bulletin, vol. 8, No. 8, Jan. 1966, @, p. 1034–D. E. Eastwood.

Primary Examiner—Patrick R. Salce
Assistant Examiner—Mark D. Simpson
Attorney, Agent, or Firm—James R. Duzan; E. Harrison Gilbert, III

[57] ABSTRACT

A location detecting apparatus for use with a fluid conducting conduit in which a movable member moves includes an internally mounted magnet attached to the movable member and an external portion attached to the conduit for magnetically interacting with the internal magnet when the movable member is moved to a predetermined location. In the preferred embodiment there are two magnets, one extending from each end of the movable member. In this embodiment, the external portion includes two similar assemblies, each attached to a respective end of the conduit and each including suitable magnetically responsive switches, a reducing flange attached to the conduit, a manifold pipe extending through the reducing flange, and a clamping mechanism for releasably attaching the switches to the manifold pipe.

19 Claims, 6 Drawing Figures

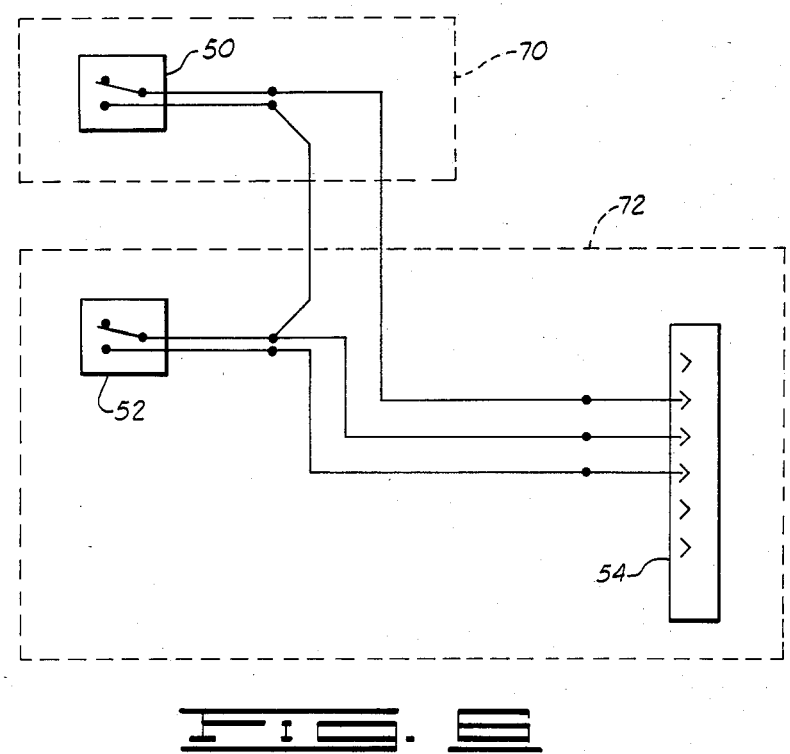
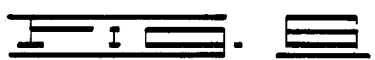
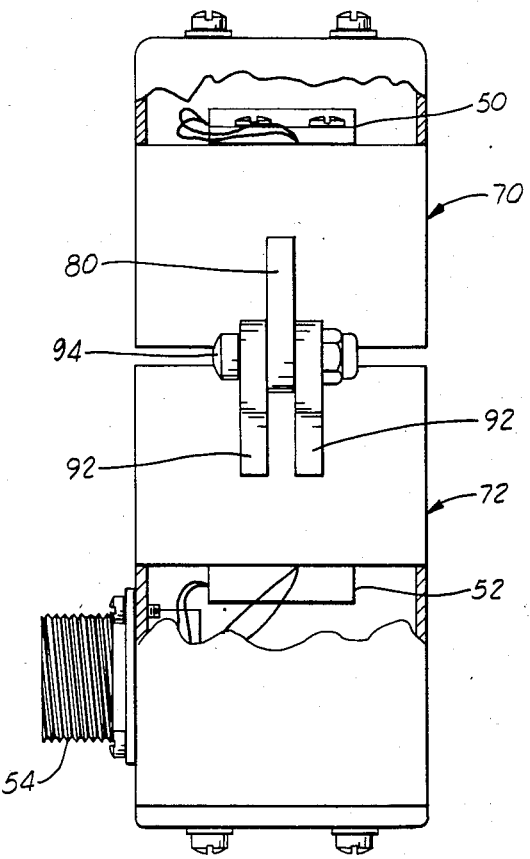
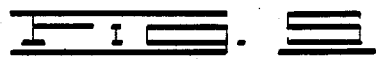

MAGNETIC DETECTOR APPARATUS

BACKGROUND OF THE INVENTION

This invention relates generally to apparatus for detecting a location of a movable member in a conduit and more particularly, but not by way of limitation, to magnetic detection apparatus for a reactor tube in which a viscous fluid is reacted and from which the reacted fluid is pumped.

In a fluid conducting system, movable objects, such as pigs or plugs, are used to separate volumes of fluids conveyed through a conduit of the system. It is sometimes necessary to detect where such a movable object is in the conduit. For example, it is sometimes necessary to determine that an object has reached an end of the conduit so that valves can be actuated to change the direction of flow through the conduit.

By way of a specific example, reference is made to the continuous reactor system described in U.S. patent application Ser. No. 615,440 filed 5-30-84 now U.S. Pat. No. 4,595,566. This continuous reactor system includes two cylindrical reactor vessels, specifically tubes, each of which contains a bidirectionally movable object separating a polymerizing fluid from a completed polymer. In the operation of this system, the objects (referred to as plugs or pigs, of which "pigs" will be used herein) are pumped from one end of their respective vessels to the other. When one of the pigs reaches the end of its respective tube, flow control valves must be actuated to reverse the flow in both vessels. If the flow from the reactor is to be continuous, this valve actuation and flow reversal needs to be automated. Such automation requires that the location of the pigs at the end of their respective vessels be automatically detected.

Several types of detector apparatus, by which a pig position or location indicating signal is generated, have been used or proposed to be used in association with objects moving through fluid conveying conduits. One of these types includes a mechanical switch having an actuator arm physically extending through the side wall of the conduit for mechanically engaging with the moving object. Such an object may be a spherical meter prover ball or the sides of a flexible pig, for example.

Such a mechanical switch extending into the environment of the conduit and relying upon suitable actuation by the pig has shortcomings. One of these is that the switch cannot be perfectly sealed so that fluid from the conduit leaks into the working components of the switch. When the fluid is a viscous polymer, for example, this leaked fluid gums up the switch components, thereby rendering the switch inoperative. Additionally, such a switch is sensitive to the pressure within the conduit since part of the switch is exposed within the conduit. Furthermore, when such a switch is used with a flexible pig, the flexible sides of the pig are sometimes not sufficiently rigid to consistently actuate the switch.

Another type of previously disclosed detector apparatus includes an electrically energized proximity switch that is placed outside the conduit, but in responsive association with a pressure balanced piston connected to the conduit so that an actuator arm from the piston responds to engagement by the pig. When the actuator arm is engaged so that the pressure balanced piston moves, the piston causes a change in an electrical characteristic, such as the reluctance, of the proximity switch circuit, thereby indicating the pig has reached the predetermined location.

One shortcoming of this second type of apparatus is that the piston is, similarly to the mechanical switch, rendered inoperative by viscous fluids, for example, within the conduit because such fluids enter the piston housing, which has openings for achieving the pressure balance. Additionally, this type requires an electronics package in that electrical power needs to be provided to the proximity switch for providing the voltage or current by which the electrical characteristic is reflected. Such an electronics package can be temperature sensitive so that its operation is not necessarily constant throughout different environments in which it might be used.

A third type of detector apparatus includes an electrical conductor coiled around the conduit through which a magnetic pig moves so that an electrical characteristic of the circuit of which the coil forms a part is changed in response to the pig moving through the portion of the conduit about which the coil is wrapped. Although this type does not have the mechanical problems associated with the mechanical portions of the forementioned switches, this type still requires an electronics package which must provide a relatively large current to operate the coil and which has been found to be temperature sensitive. Furthermore, the pig of this type of detector is made entirely of a magnetic material, which thereby prevents it from being made of another type of material which might be more suitable for withstanding deterioration brought about by the various fluids in which it might need to be used. This is particularly significant in a system wherein corrosive fluids are propelled or separated by pigs used in operations at an oil or gas well.

In view of the foregoing shortcomings, there is the need for an improved detector apparatus which is not adversely affected by the type of fluid used, or the pressures or temperatures existing, within the fluid conducting system. Such an apparatus should not require significant electronic packages so that external power is not needed at the conduit to initiate the detection. Such apparatus should also be one wherein the pig with which it is used need not be made of a special material to provide the activation, but rather can be made of a protective material suitable for the environment in which the pig will be used. The apparatus should also be constructed so that the interaction between the activating portion and the activated portion from which the location indicating signal is provided reliably occurs to consistently indicate the moving object has reached the predetermined location or position.

SUMMARY OF THE INVENTION

The present invention overcomes the above-noted and other shortcomings of the prior art by providing a novel and improved apparatus for detecting a location of a movable member in a conduit. The present invention meets the aforementioned needs. In particular, the present invention utilizes no mechanical piston or plunger that can be adversely affected by the nature of the fluid in the conduit or by the pressure which exists within the conduit. The present invention also requires no sophisticated electronics, thereby precluding external power and temperature considerations. The present invention is not sensitive to the rotational position of the pig within the conduit. The main pig body does not actuate the location indicating signal; therefore, it can be made of any suitable material, such as of a type which can withstand corrosive fluids that might be used in the system incorporating the present invention.

Broadly, the present invention provides an apparatus for detecting a location of a movable member in a conduit, comprising a magnet connected to the movable member so that the magnet moves with the movable member inside the conduit and also comprising a magnetically responsive switch means, connected to the outside of the conduit, for changing switch states when the magnet moves to an internal location of the conduit where the magnetic flux of the magnet actuates the switch means. In a particular embodiment the apparatus further comprises an end member attached to the conduit, which end member has an aperture defined therethrough; a stop member extending through the aperture so that a first portion extends beyond one side of the end member into the conduit and so that a second portion extends beyond another side of the end member outside the conduit, which first portion engages the movable member when the movable member reaches a predetermined location in the conduit; and attachment means for attaching the switch means to the second portion of the stop member. This attachment means includes, in such embodiment, a first clamp member having the switch means connected thereto, a second clamp member pivotally connected to the first clamp member, and retaining means for maintaining the first and second clamp members in a closed position about the stop member so that the clamp members, and the connected switch means, are thereby connected to the conduit.

Therefore, from the foregoing, it is a general object of the present invention to provide a novel and improved apparatus for detecting a location of a movable member in a conduit. Other and further objects, features and advantages of the present invention will be readily apparent to those skilled in the art when the following description of the preferred embodiment is read in conjunction with the accompanying drawings.

BRIEF DESCRIPTION OF THE DRAWINGS

FIG. 5 is a side elevational view of the clamp assembly.

FIG. 6 is a schematic circuit diagram of two switches contained within the clamp assembly.

DETAILED DESCRIPTION OF THE PREFERRED EMBODIMENT

Figures 1, 2:
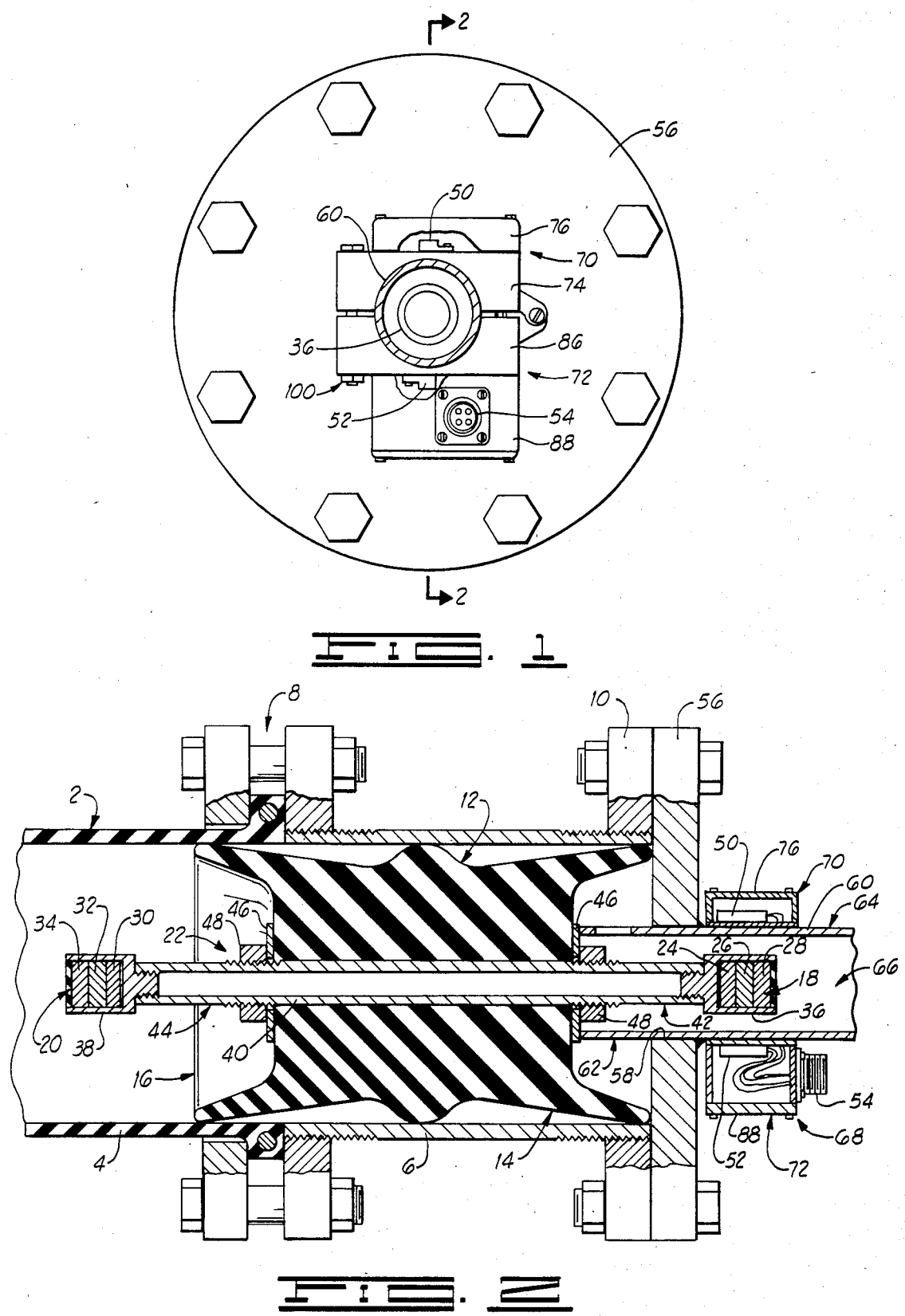
FIG. 1 is an end view of an external portion of the preferred embodiment of the present invention, which portion is connected to a conduit and has part of an internal portion of the preferred embodiment disposed therein.
FIG. 2 is a side sectional view taken along line 2—2 shown in FIG. 1.
Figure 3:
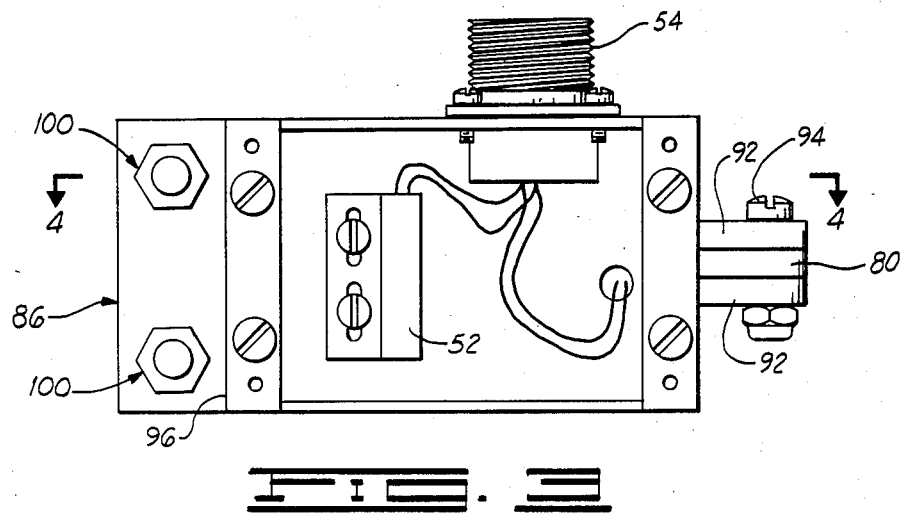
FIG. 3 is a bottom end view of a clamp assembly of the external portion, which clamp assembly is shown having a bottom plate removed.

The present invention generally provides an apparatus for detecting a location of a movable member in a conduit. The preferred embodiment of this invention will be particularly described with reference to a continuous reactor system, such as of the viscous fluid reacting and pumping type disclosed in U.S. patent application Ser. No. 615,440, having, as the conduit, at least one reactor tube 2. The tube 2 includes a flexible tubing 4 connected to a metallic end adapter 6 at a flanged joint 8. The adapter 6 terminates the tube 2 at a flange 10. The movable member which moves through the tube 2 is a fluid-sealing pig or wiper plug 12 made of a material suitable to resist significant deterioration which could be caused by the pig-separated fluids being moved through the tube 2 adjacent the pig 12.

The pig 12 will not be particularly described, other than to indicate it has two ends 14, 16, because the pig 12 can be of any suitable construction adaptable to the remainder of the present invention, the preferred embodiment of which is described hereinbelow. That is, the body of the pig 12, itself, does not affect the detection operation of the present invention, other than as is apparent or inherent from the following description. One specific embodiment of the pig 12 suitable for use in the present invention is described in a copending U.S. patent application entitled "Pig for a Fluid Conducting System" and assigned to the assignee of the present invention.

The location detecting apparatus of the preferred embodiment includes an internal portion and an external portion which do not mechanically or electrically interact. These two portions do magnetically interact, however. The internal portion will be described with reference to FIG. 2, and the external portion will be described with reference to FIGS. 1-6.

The internal portion of the preferred embodiment depicted in FIG. 2 is connected to, and moved with, the pig 12. The internal portion of the preferred embodiment includes two magnetic bodies 18, 20 and support means 22 for connecting one of the magnetic bodies 18, 20 to, but spaced in a first direction from, the pig 12 and for connecting the other of the magnetic bodies 18, 20 to, but spaced in a second direction from, the pig 12 so that one of the magnets 18, 20 leads and the other of the magnets 18, 20 trails the pig 12 dependent upon the direction the pig 12 moves through the conduit.

The magnetic body 18 includes three disk magnets 24, 26, 28 axially aligned and disposed adjacent each other to define a cylindrical magnet, and the magnetic body 20 is similarly constructed of three disk magnets 30, 32, 34. The magnetic bodies 18, 20 are coaxially positioned relative to the pig 12 and relative to the tube 2. The magnetic bodies 18, 20 are disposed in spaced relation from the ends 14, 16, respectively, of the pig 12. This spatial relationship is in the aforementioned first and second directions, respectively. This spatial separation means the magnetic body 18 leads the pig 12/internal portion assembly when the pig 12 moves to the right as viewed in FIG. 2, and the magnetic body 18 trails the pig 12 when the assembly moves to the left as viewed in FIG. 2. The converse is true for the magnetic body 20 in that it trails when movement is to the right as viewed in FIG. 2 and it leads when movement is to the left as viewed in FIG. 2.

The support means 22 includes magnet housings 36, 38. The housing 36 has a cavity defined therein in which the magnetic body 18 is retained, and the housing 38 has a cavity in which the magnetic body 20 is retained. The magnetic housings 36, 38 are connected in coaxial positions relative to the plug 12 by suitable coupling means.

This coupling means in the preferred embodiment includes a rod 40 having an end 42, which extends axially outwardly from the end 14 of the pig 12, and further having an end 44 extending axially outwardly from the end 16 of the pig 12. The end 42 has the housing 36 connected thereto, such as by threaded engagement, and the end 44 has the housing 38 similarly connected thereto. The rod 40 is retained to the pig 12 by washers 46 and jamb nuts 48 disposed adjacent the ends 14, 16 of the pig 12 shown in FIG. 2.

In the illustrated embodiment, the rod 40 is disposed through an axial opening defined through the pig 12. This positioning is coaxial with the pig 12 and with the conduit represented by the reactor tube 2. The housings 36, 38, and their respective magnetic bodies 18, 20, are likewise maintained in a coaxial relationship. The significance of this is that by being coaxial, the magnetic bodies 18, 20 are always maintained centrally within the conduit, and specifically coaxial therewith, regardless of the rotational disposition of the pig 12 within the conduit. Therefore, the rotational disposition of the pig 12 does not affect the position or distribution of the magnetic flux which is intended to uniformly act around the circumference of the conduit. This central positioning of the rod 40 and its attached elements also provides an annular volume around the ends 42, 44 and the housings 36, 38 so that the fluid contained in the conduit can readily flow or move into such annular volumes.

The external portion with which the above-described internal portion magnetically interacts includes switch means, disposed wholly outside the conduit, for responding to at least one of the magnetic bodies 18, 20 when the pig 12 moves through the conduit to a location therein near where the switch means is disposed outside the conduit. The external portion also includes non-magnetic connector means for connecting the switch means with the conduit. Both the switch means and the connector means will be described with reference to their applicability to the end of the reactor tube 2 shown in FIG. 2; however, it is to be understood that in this particular embodiment used with the exemplary reactor system another similar switch means and connector means are connected to the other end of the reactor tube 2.

The illustrated switch means of the preferred embodiment includes two magnetically responsive reed switches 50, 52. The reed switches 50, 52 change their states when the magnetic body 18 moves to an internal location where the magnetic flux from the magnetic body 18 can affect, and thereby actuate, the switches 50, 52. The two switches 50, 52 are spaced in the preferred embodiment diametrically opposite each other. This spacing is maintained by the subsequently described connector means. The switches 50, 52 are electrically interconnected as schematically illustrated in FIG. 6, wherein each switch is shown to share a common terminal of an electrical connector 54. The other terminal of each of the switches 50, 52 has its own respective conductor connected to a respective terminal of the electrical connector 54.

The illustrated connector means by which the switches 50, 52 are connected to the reactor tube 2 in the preferred embodiment includes receiving means for receiving the magnet housing 36 and the magnetic body 18 when the pig 12 is moved to the illustrated end of the reactor tube. The connector means also includes attachment means for attaching the switches to the receiving means. Although both of these elements of the connector means are included in the preferred embodiment separate from the previously described parts of the invention and reactor system, it is contemplated that the switches can be connected directly to the conduit through which the pig 12 is moving, whereby the conduit would act as the "receiving means." In the preferred embodiment where the switches 50, 52 are connected to the illustrated end of reactor tube 2, the receiving means includes the following structure which is best viewed in FIG. 2.

The receiving means shown in FIG. 2 includes an end member 56 attached to the reactor tube 2 at the flange 10. The end member 56 is specifically defined as a reducing flange having an aperture 58 defined therein so that the aperture 58 is disposed coaxially relative to the reactor tube 2 when the end member 56 is connected to the flange 10. This coaxial relationship is also with respect to the magnetic body 18 for this portion of the receiving means shown in FIG. 2. The diameter of the aperture 58 is smaller than the diameter of the interior of the reactor tube 2 through which the pig 12 moves; however, this diameter is larger than the outer diameter of the magnet housing 36. The end member 56 has a flat plate configuration and is made of a suitable non-magnetic or, more generally, a magnetically permeable material so that it does not affect the operation of the magnetic body 18 and the magnetically responsive switches 50, 52.

The receiving means also includes a stop member 60 extending through the aperture 58 so that a first portion 62 of the stop member 60 extends beyond one side of the end member 56 into the reactor tube 2 and so that a second portion 64 of the stop member 60 extends beyond another side of the end member 56 outside the reactor tube 2. The portion 62 extends sufficiently into the reactor tube 2 so that it engages the pig 12 when the pig 12 reaches a predetermined location in the reactor tube 2. This is illustrated in FIG. 2 by the abutment between the end of the portion 62 and the end 14 (specifically the washer 46 adjacent thereto) of the pig 12. To cushion the abutment, a suitable cushioning member (not shown) can be attached to either or both of the abutting elements. This stopping action can be used as a back-up to a fluid flow reversing, and braking, operation that might be initiated when the switches 50, 52 properly operate, should such switches fail to operate.

The stop member 60 used in the preferred embodiment is a hollow manifold pipe which extends through the aperture 58 and is welded or otherwise connected to the end member 56. The manifold pipe acts to convey a flow of fluid into or out of the reactor tube 2. This flow occurs through an interior chamber 66 into which the housing 36 and the magnetic body 18 are movable as depicted in FIG. 2. This interior chamber 66 has a diameter which is greater than the outer diameter of the housing 36 so that an annulus is defined along the length of the housing 36 and also along the length of the smaller diametered support rod 42. This allows fluid to be disposed around these elements connected to the pig 12. When the housing 36 has moved a predetermined distance into the stop member pipe 60, the end of the stop member 60 then abuts the pig 12.

In the preferred embodiment, mounted on the external portion 64 of the stop member 60 is the portion of the attachment means by which the switches 50, 52 are connected to the reactor tube 2. The construction of the preferred embodiment of this portion of the attachment means is shown throughout FIGS. 1–5. In this preferred embodiment the attachment means includes clamp means for releasably attaching the switches 50, 52, in general, to the conduit and, specifically, to an external surface of the portion 64 radially outwardly from the internal location within the chamber 66 at the predetermined distance to which the magnet housing 36 and magnetic body 18 can be moved.

The clamp means is embodied as an assembly 68 which includes a switch housing 70 having the switch 50 housed therein, another switch housing 72 having the switch 52 housed therein, and means for connecting the two switch housings 70, 72 together adjacent respective contours of the stop member 60.

The switch housing 70 defines a clamp member which in the preferred embodiment is in the form of a yoke 74 and a switch enclosure 76. The yoke 74 has a generally rectangular shape but with a semicircular notch or contour 78 defined therein. The contour 78 is complementally shaped to a corresponding contour of the stop member 60. Since the stop member 60 is embodied as a cylindrical pipe, the contour 78 has the illustrated concave semicircular shape which will receive a complemental convex semicircular portion of the circumference of the stop member 60.

Extending from one end of the yoke 74 is a connector eyelet portion 80. Defined through the yoke 74 is a hole 81 through which run electric conductors connected to the switch 50. Attached to the top (as viewed in FIGS. 1 and 4) surface of the yoke 74 is the switch 50 and the switch enclosure 76. The switch enclosure 76 has a side wall 82 and a top wall 84 which define a cavity into which the switch 50 extends when the switch enclosure 76 is bolted or otherwise releasably connected to the yoke 74 as shown in the drawings.

The switch housing 72 is constructed similarly to the switch housing 70 in that it includes a clamp member which comprises a yoke 86 and a switch enclosure 88. The yoke 86 is formed complementally to the yoke 74 so that it has a contour 90 for receiving a complemental contour of the stop member 60 and so that it also has a pair of spaced connector eyelet portions 92 which are pivotally connected, such as by a pin 94, to the eyelet portion 80 of the yoke 74 whereby the two clamp members are pivotally connected. Defined through the yoke 86 is a hole 95 through which run the conductors connected to the switch 50. The switch enclosure 88 is constructed similarly to the enclosure 76 except that the enclosure 88 has a taller side wall 96 so that a larger switch-receiving cavity is defined for also receiving the electrical wiring, depicted in the drawings, and so that the electrical connector 54 can be attached thereto. The cavity of the enclosure 88 is also defined by a removable end plate 98, which can be referred to as a bottom plate for the disposition shown in the drawings.

Figure 4:
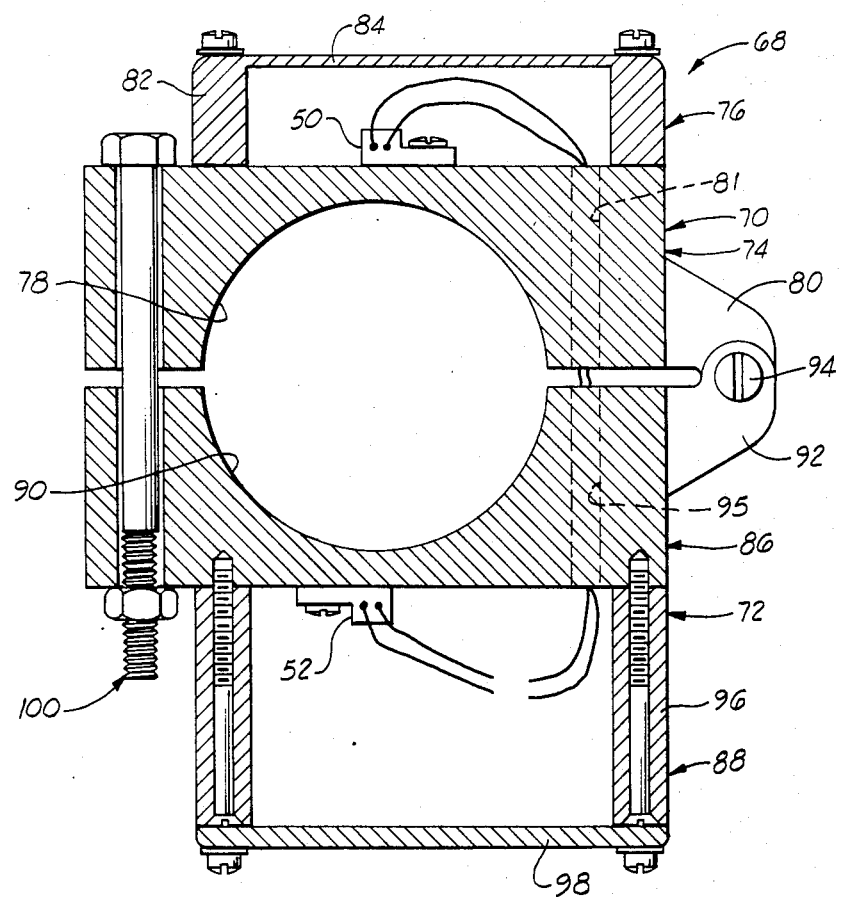
FIG. 4 is a sectional elevational view of the clamp assembly taken along line 4—4 shown in FIG. 3, which clamp assembly is shown having the bottom plate attached.

The aforementioned pivot pin 94 forms part of the means for connecting the switch housings 70, 72 about the stop member 60. The pin 94, in cooperation with the eyelet portions 80, 92, define pivot means for pivotally connecting the two switch housings 70, 72. Forming another part of the connecting means is a retaining means for retaining the two switch housings 70, 72 in a pivotally closed position adjacent the stop member 60 of the receiving means. In the illustrated embodiment the retaining means includes two nut and bolt assemblies 100, the bolts of which extend through holes defined through the yokes 74, 86, respective ones of which holes are best seen in FIG. 4.

In using the preferred embodiment of the present invention, the stop member 60 and the end member 56 are assembled and attached to the flange 10. Similar action is taken at the other end of the reactor tube 2; however, this and similar duplicated actions which would occur at the other end are not more specifically described because they are the same as those related to what occurs at the end shown in FIG. 2.

The switches 50, 52 and their respective switch housings 70, 72 are assembled and pivoted about the pin 94 into an open position so that the jaws defined by the yokes 74, 86 can be moved around the stop member 60. The yokes 74, 86 are then moved into their closed position with the contours 78, 90 receiving, or nesting with, the respective convex contours of the stop member 60. The nut and bolt assemblies 100 are then attached to maintain the switch housings 70, 72 in their closed, clamp-like position as shown in FIG. 1.

The assembled pig and internal portion, having previously been assembled and placed in the reactor tube 2, is movable through the normal operation of the system in which the reactor tube 2 is located in a manner as known to the art. When the pig 12 reaches one of the ends of the reactor tube 2, such as the one illustrated in FIG. 2, the location detecting operation performed by the present invention occurs. As the pig 12 reaches this end of the reactor tube 2, it approaches the end member 56, which end member has adapted the smaller sized manifold pipe defining the stop member 60 to the reactor tube 2. The stop member 60 protrudes through the end member 56 to act as a mechanical stop for the pig 12. The magnet housing 36, containing the magnetic body 18, enters the chamber 66 of the stop member 60 as the pig 12 continues to move toward the reducing flange 56. The magnetic flux produced by the magnetic body 18 actuates the two reed switches 50, 52 when the magnet housing 36 has moved sufficiently inwardly into the chamber 66 of the manifold pipe 60. As schematically illustrated in FIG. 6, the two switches 50, 52 are wired with and connected through the electrical connector 54 to suitable control circuitry whereby the actuation of the switches 50, 52 is noted and used to provide control signals. For example, such control signals could be provided to a valve controller of a type needed for controlling the valves of the reactor system described in U.S. patent application Ser. No. 615,440. Such valve control could act to reverse the fluid flow through the reactor tube 2, and the stop member 60, so that once the pig 12 reaches the end shown in FIG. 2, the flow would be reversed to exert, through the annulus around the magnet housing 36 and support rod 42, a force acting against the end 14 of the pig 12 whereby the pig 12 is moved back to the left as viewed in FIG. 2 for travel to the other end of the reactor tube whereupon the magnetic body 20 would interact with the there-located other external portion constructed similarly to that depicted in FIG. 2.

Thus, the present invention is well adapted to carry out the objects and attain the ends and advantages mentioned above as well as those inherent therein. While a preferred embodiment of the invention has been described for the purpose of this disclosure, numerous changes in the construction and arrangement of parts can be made by those skilled in the art, which changes are encompassed within the spirit of this invention as defined by the appended claims.

What is claimed is:

1. An apparatus for detecting a location of a movable member in a conduit, comprising:
    a magnet connected to the movable member so that said magnet moves with the movable member inside the conduit;

a magnetically responsive switch means, connected to the outside of the conduit, for changing switch states when said magnet moves to an internal location of the conduit where the magnetic flux of said magnet actuates said switch means;

an end member attached to the conduit, said end member having an aperture defined therethrough;

a stop member extending through said aperture so that a first portion extends beyond one side of the end member into the conduit and so that a second portion extends beyond another side of the end member outside the conduit, said first portion engaging the movable member when the movable member reaches a predetermined location in the conduit; and attachment means for attaching said switch means to said second portion of said stop member.

2. An apparatus as defined in claim 1, wherein said magnet is connected to the movable member so that said magnet is coaxially positioned relative to the conduit.

3. An apparatus as defined in claim 1, wherein said switch means includes:
a first reed switch connected to the conduit at a first location; and
a second reed switch connected to the conduit at a second location spaced diametrically opposite said first location.

4. An apparatus as defined in claim 1, wherein said switch means is connected to the outside of the conduit by connector means of said apparatus, said connector means including:
a first clamp member having said switch means connected thereto;
a second clamp member pivotably connected to said first clamp member; and
retaining means for maintaining said first and second clamp member in a closed position for connection to the conduit.

5. An apparatus as defined in claim 4, wherein said connector means further includes an enclosure connected to said first clamp member so that said switch means is disposed therein.

6. An apparatus as defined in claim 4, wherein said connector means further includes:
a reducing flange connected to the conduit, said reducing flange having an aperture defined therethrough, said aperture having a diameter smaller than the diameter of the interior of the conduit through which the movable member moves; and
a pipe having an end extending through said aperture on one side of said reducing flange and into the interior of the conduit and having a portion extending beyond the other side of said reducing flange, said portion having said first and second clamp member removably secured thereto by said closure retaining means.

7. An apparatus as defined in claim 6, wherein said magnet is connected to the movable member in spaced relation ahead of a leading end of the movable member so that said magnet moves into said pipe as the movable member moves near said reducing flange.

8. An apparatus as defined in claim 7, wherein said end of said pipe defines stop means for engaging the movable member when said magnet has moved a predetermined distance into said pipe.

9. A bidirectional detection apparatus for a movable member movable through a conduit, comprising:

a first magnet;
a second magnet;
support means for connecting said first magnet to, but spaced in a first direction from, the movable member and for connecting said second magnet to, but spaced in a second direction from, the movable member so that one of said first and second magnets leads and the other of said first and second magnets trails the movable member dependent upon the direction the movable member moves through the conduit; and
switch means, disposed outside the conduit, for responding to at least one of said first and second magnets when the movable member moves through the conduit to a location therein near where said switch means is disposed outside the conduit.

10. An apparatus as defined in claim 9, further comprising clamp means for releasably attaching said switch means to the conduit.

11. An apparatus as defined in claim 9, wherein said support means includes:
a first housing attached near one end of the movable member, said first housing having a cavity in which said first magnet is retained; and
a second housing attached near another end of the movable member, said second housing having a cavity in which said second magnet is retained.

12. An apparatus as defined in claim 9, wherein:
said switch means includes a first magnetically responsive switch and a second magnetically responsive switch; and
said apparatus further comprises:
first clamp means for releasably attaching said first magnetically responsive switch near one end of the conduit; and
second clamp means for releasably attaching said second magnetically responsive switch near the other end of the conduit.

13. An apparatus as defined in claim 9, further comprising:
an end member attached to the conduit, said end member having an aperture defined therethrough;
a stop member extending through said aperture so that a first portion extends beyond one side of the end member into the conduit and so that a second portion extends beyond another side of the end member outside the conduit, said first portion engaging the movable member when the movable member reaches a predetermined location in the conduit; and
attachment means for attaching said switch means to said second portion of said stop member.

14. A detection apparatus for a reactor tube in which a viscous fluid is reacted and from which the reacted fluid is pumped, comprising:
a sealing pig disposed in the reactor tube for separating two volumes of fluid, said pig having a first end and a second end;
a magnet housing;
coupling means for coupling said magnet housing to said pig;
a magnet disposed in said magnet housing;
receiving means, connected to an end of the reactor tube, for receiving said magnet housing and magnet when said pig is moved to the end of the reactor tube;

switch means for changing switch states in response to a magnetic force; and attachment means for attaching said switch means to said receiving means.

15. An apparatus as defined in claim 14, wherein:

said receiving means includes:
- a reducing flange connected to the reactor tube, said reducing flange having an aperture defined therein coaxially related to the reactor tube; and
- a hollow stop member having an interior chamber into which said magnet housing and magnet are movable, said stop member extending through said aperture and into the reactor tube so that the first end of said pig engages said stop member after said magnet housing and said magnet have moved a predetermined distance into said chamber; and said attachment means includes clamp means for clamping said switch means to an external portion of said stop member radially outwardly from the internal location within said chamber at the predetermined distance to which said magnet housing and magnet can be moved.

16. An apparatus as defined in claim 14, wherein:

said switch means includes a first switch and a second switch; and said attachment means includes:
- a first switch housing having said first switch housed therein;
- a second switch housing having said second switch housed therein;
- pivot means for pivotably connecting said first and second switch housings; and
- retaining means for retaining said first and second switch housings in a pivotally closed position adjacent said receiving means.

17. An apparatus as defined in claim 14, wherein said coupling means includes a rod having an end extending axially outwardly from said first end of said pig and having said magnet housing connected thereto.

18. An apparatus as defined in claim 17, wherein:

said rod also has another end, extending axially outwardly from said second end of said pig; and said apparatus further comprises:
- a second magnet housing, connected to said another end of said rod;
- a second magnet, disposed in said second magnet housing; and
- means, connected to another end of the reactor tube, for responding to said second magnet when said pig moves to the another end of the reactor tube.

19. An apparatus as defined in claim 14, wherein:

said receiving means includes manifold pipe means, connected in fluid communication with the reactor tube, for conveying a flow of fluid into the reactor tube and for receiving said magnet housing and magnet so that an annulus is formed between said manifold pipe means and said housing, whereby the fluid flows through said annulus; and said attachment means includes:
- a first yoke having a contour complementally shaped to a contour of said manifold pipe means;
- a second yoke having a contour complementally shaped to a contour of said manifold pipe means;
- means for connecting said first and second yokes together adjacent respective contours of said manifold pipe means; and
- switch enclosure means, connected to said first yoke, for enclosing said switch means adjacent said first yoke.

* * * * *